(12) United States Patent
Horita et al.

(10) Patent No.: US 10,001,192 B2
(45) Date of Patent: Jun. 19, 2018

(54) TORSIONAL VIBRATION REDUCING APPARATUS

(71) Applicant: TOYOTA JIDOSHA KABUSHIKI KAISHA, Toyota-shi (JP)

(72) Inventors: Shuhei Horita, Numazu (JP); Yu Miyahara, Susono (JP); Shingo Aijima, Susono (JP); Fusahiro Tsukano, Susono (JP); Atsushi Honda, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/301,630

(22) PCT Filed: Apr. 2, 2015

(86) PCT No.: PCT/IB2015/052442
§ 371 (c)(1),
(2) Date: Oct. 3, 2016

(87) PCT Pub. No.: WO2015/151060
PCT Pub. Date: Oct. 8, 2015

(65) Prior Publication Data
US 2017/0175851 A1    Jun. 22, 2017

(30) Foreign Application Priority Data
Apr. 4, 2014    (JP) .................................. 2014-077570

(51) Int. Cl.
*F16F 15/10*    (2006.01)
*F16D 3/12*    (2006.01)
(Continued)

(52) U.S. Cl.
CPC ............. *F16F 15/145* (2013.01); *F16F 15/31* (2013.01); *F16D 3/12* (2013.01); *F16F 15/10* (2013.01); *F16F 15/30* (2013.01)

(58) Field of Classification Search
CPC .......... F16F 15/10; F16F 15/14; F16F 15/145; F16F 15/1457; F16F 15/30; F16F 15/31; F16D 3/12
See application file for complete search history.

(56) References Cited

U.S. PATENT DOCUMENTS 9,518,631 B2 * 12/2016 Miyahara .............. F16F 15/145
9,835,225 B2 * 12/2017 Juan Lien
                              Chang ................. F16F 15/3153
(Continued)

FOREIGN PATENT DOCUMENTS

DE    10 2009 021355 A1    12/2009
DE       102013207294 A1 *  11/2013 ............ F16F 15/145
(Continued)

OTHER PUBLICATIONS

Machine translation of EP 1865222 A1 obtained on Oct. 6, 2017.*
International Search Report dated Jul. 29, 2015 in PCT/IB/052442 filed Apr. 2, 2015.

*Primary Examiner* — Adam D Rogers
(74) *Attorney, Agent, or Firm* — Oblon, McClelland, Maier & Neustadt, L.L.P.

(57) ABSTRACT

A torsional vibration reducing apparatus is provided. The torsional vibration reducing apparatus includes a rotating body having a rolling chamber, and a rolling body including a support shaft portion, a first flange portion, a second flange portion, a first corner portion, and a second corner portion. The support shaft portion is housed in the rolling chamber. The flange portions are located respectively at either end of the support shaft portion in an axial direction. A position defined by the support shaft portion and the first flange (Continued)

portion is the first corner portion, and a position defined by the support shaft portion and the second flange portion is the second corner portion. In a section of the rolling body that is along a central axis of the support shaft portion, sectional shapes of the first corner portion and the second corner portion differ from each other.

5 Claims, 8 Drawing Sheets

(51) Int. Cl.
  *F16F 15/14*   (2006.01)
  *F16F 15/31*   (2006.01)
  *F16F 15/30*   (2006.01)

(56) References Cited

U.S. PATENT DOCUMENTS

| | | |
|---|---|---|
| 2011/0179782 A1 | 7/2011 | Huegel et al. |
| 2015/0276013 A1* | 10/2015 | Kawazoe ......... F16F 15/13484 464/68.2 |
| 2015/0369334 A1* | 12/2015 | Dinger ................. F16F 15/145 74/574.2 |
| 2016/0053878 A1* | 2/2016 | Amano .................. F16H 45/02 60/338 |

FOREIGN PATENT DOCUMENTS

| | | | | |
|---|---|---|---|---|
| DE | 102014217007 A1 | * | 3/2015 | ............ F16F 15/145 |
| DE | 102013226024 A1 | * | 6/2015 | ............ F16F 15/145 |
| DE | 102014225965 A1 | * | 6/2015 | ............ F16F 15/145 |
| DE | 102015211772 A1 | * | 1/2016 | ............ F16F 15/145 |
| DE | 102015200766 A1 | * | 7/2016 | ............ F16F 15/145 |
| EP | 1865222 A1 | * | 12/2007 | ............ F16F 15/145 |
| JP | 08-093854 A | | 4/1996 | |
| JP | 08-093855 A | | 4/1996 | |
| JP | 2012145191 A | * | 8/2012 | |
| JP | 2013-185598 A | | 9/2013 | |
| JP | 2015113877 A | * | 6/2015 | |
| WO | WO-2015154768 A1 | * | 10/2015 | ............ F16F 15/145 |
| WO | WO-2015185056 A1 | * | 12/2015 | ............ F16F 15/145 |
| WO | WO-2016008482 A1 | * | 1/2016 | ............ F16F 15/145 |
| WO | WO-2016015725 A1 | * | 2/2016 | ............ F16F 15/145 |

* cited by examiner

TORSIONAL VIBRATION REDUCING APPARATUS

BACKGROUND OF THE INVENTION

1. Field of the Invention

The invention relates to an apparatus for reducing torsional vibration by reciprocal motion or pendulum motion of an inertial mass body.

2. Description of Related Art

Examples of an apparatus of this kind are described in Japanese Patent Application Publication No. 8-93855 (JP 8-93855 A) and Japanese Patent Application Publication No. 8-93854 (JP 8-93854 A). In each of these apparatuses, an inertial mass body is structured as a rolling body. The rolling body is formed such that an axial length thereof is longer than a plate thickness of a rotating body, and an annular groove, a width of which is slightly larger than the plate thickness of the rotating body, is formed for an entire circumference of the rolling body in a central section in an axial direction thereof. In particular, in the apparatus described in JP 8-93854 A, the rolling body is configured by including two members: a roller that is formed with a flange-shaped projection at one end, and a side plate that is formed separately from the roller and attached to another end of the roller. Each of the rolling bodies described in JP 8-93855 A and JP 8-93854 A has a so-called H-shaped section. The rolling body is housed in a guide hole that is formed in the rotating body. A portion of an inner surface of the guide hole that is on an outer side in a radial direction of the rotating body serves as a guide surface, and a bottom section of the above annular groove contacts the guide surface. A portion of the rotating body is held in the annular groove, that is, between the projection and the side plate, just as described. In this way, displacement of the rolling body in the axial direction is restricted. In addition, Japanese Patent Application Publication No. 2013-185598 (JP 2013-185598 A) describes a rolling body in which a surface corresponding to an inner side surface of the above annular groove is formed as a tapered surface.

SUMMARY OF THE INVENTION

In a configuration described in JP 8-93855 A, either one of inner side surfaces of the rolling body, which form the annular groove, possibly contacts a side surface of the rotating body, and a vibration damping property is possibly degraded due to friction between these surfaces. It is because, if a force in an axial direction of the rotating body acts on the rolling body in a state that this rolling body moves reciprocally along the guide surface, the rolling body moves in the above direction, and either one of the inner side surfaces of the rolling body is possibly brought into contact with the side surface of the rotating body. Such a situation also arises in the apparatus described in JP 8-93854 A.

It should be noted that the inner side surface of the annular groove is formed as the tapered surface in JP 2013-185598 A. Thus, when the guide surface formed in the rotating body is brought into contact with the tapered surface, the axial force that corresponds to a centrifugal force acting on the rolling body and a tapered angle acts on the rolling body. In this way, the inner side surface of the annular groove separates from the side surface of the rotating body. This axial force is generated in each of the right and left tapered surfaces of the rolling body. Thus, when the rolling body is once displaced to one side in the axial direction, the rolling body is pushed back to another side in the axial direction by the above axial force, the other tapered surface is brought into contact with the guide surface, and the above axial force is generated again. In other words, the right and left axial forces alternately act on the rolling body. As a result, the rolling body repeatedly makes reciprocal motion in a right and left direction and thus is possibly resonated.

The invention provides a torsional vibration reducing apparatus that can suppress a deviation of a rolling body in an axial direction of a rotating body and can also suppress reciprocal motion of the rolling body in the axial direction.

A torsional vibration reducing apparatus according to one aspect of the invention is provided. The torsional vibration reducing apparatus includes a rotating body having a rolling chamber, and a rolling body including a support shaft portion, a first flange portion, a second flange portion, a first corner portion, and a second corner portion. The rolling chamber is a through-hole that extends through the rotating body in a thickness direction of the rotating body. The support shaft portion is housed in the rolling chamber of the rotating body. Further, a length in an axial direction of the support shaft portion is longer than a thickness of the rotating body. Each of the first flange portion and the second flange portion has a larger outer diameter than an outer diameter of the support shaft portion. Moreover, the first flange portion is located at one end of the support shaft portion in the axial direction, and the second flange portion is located at the other end of the support shaft portion in the axial direction. A position defined by the support shaft portion and the first flange portion is the first corner portion, and a position defined by the support shaft portion and the second flange portion is the second corner portion. In a section of the rolling body that is along a central axis of the support shaft portion, sectional shapes of the first corner portion and the second corner portion differ from each other.

According to the torsional vibration reducing apparatus according to the above aspect, when one of the first corner portion and the second corner portion is brought into contact with the rotating body, an axial force in a direction that is parallel to the axial direction of the rotating body acts on the rolling body. The axial force is defined in accordance with a centrifugal force acting on the rolling body and the shape of each of the corner portions. The corner portion that is in contact with the rotating body is separated from the rotating body by the axial force, and the other corner portion is brought into contact with the rotating body. Just as described, the above axial force is generated in each of the first corner portion and the second corner portion of the rolling body. Since the shapes of the first corner portion and the second corner portion differ from each other, magnitudes of the axial force in the first corner portion and the second corner portion differ from each other. Accordingly, even when the rolling body makes reciprocal motion in the axial direction of the rotating body due to the above-described axial force, the reciprocal motion is less likely to be repeated in a constant cycle, and thus the rolling body can be suppressed from being resonated. As a result, the reciprocal motion of the rolling body along a rolling surface is not inhibited by strong vibration of the rolling body in the axial direction. Therefore, the vibration control efficiency is enhanced. Moreover, it is possible to suppress generation of large noise or vibration due to occurrence of violent collision of the rolling body with the rotating body. Furthermore, in the case where the rolling body is displaced by a small axial force, slippage in the axial direction is less likely to occur on a rolling surface compared to a case where the rolling body is displaced by a large axial force. Thus, unnecessary friction is less likely to be generated. Therefore, durability of the apparatus according to the invention can be improved.

In the torsional vibration reducing apparatus of the above aspect, the first corner portion may be a concave surface, and the second corner portion may be a tapered surface, an outer diameter of which is gradually increased from the support shaft portion to an outer side in a radial direction of the rolling body, or a convex surface. In the case where the first corner portion is formed as the concave surface and where the second corner portion is formed as the convex surface or the tapered surface, the magnitudes of the axial force generated in the corner portions of the rolling body can differ from each other as described above. In addition, a surface of each of the above-described corner portions can be formed by a simple processing method that has conventionally been known. In other words, since no special processing is required, the rolling body with the above-described configuration can easily be processed or manufactured.

In the torsional vibration reducing apparatus of the above aspect, the rolling body may be constructed of a first member and a second member. The first member may be a member in which the first flange portion or the second flange portion is integrally configured at an end of the support shaft portion, and the second member may be a disc-shaped attachment flange that is configured to be attached to the other end of the support shaft portion. In the torsional vibration reducing apparatus as described above, the rolling body can be constructed of the first member and the second member. Thus, when the above-described convex surface or tapered surface is formed in the attachment flange as the second member, such a surface can easily be processed compared to a case where such a surface is formed in the first member. In addition, in the case where the rolling chamber is formed such that an opening width thereof is larger than an outer diameter of the support shaft portion and smaller than an outer diameter of each of the flange portions in order to reduce clearance between an inner surface of the rolling chamber and an outer circumferential surface of the support shaft portion as much as possible, the attachment flange as the second member may be attached to the other end of the support shaft portion after the support shaft portion of the first member is inserted in the rolling chamber. Therefore, assemblability of the apparatus is favorable.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a torsional vibration reducing apparatus according to an embodiment of the invention will be described with reference to FIG. 1 to FIG. 10. FIG. 10 is a front view of an example of the torsional vibration reducing apparatus. A rotating body 1 is a disc-shaped member that is attached to a rotating member, such as an unillustrated drive shaft, which generates torsional vibration. Four rolling chambers 2 are formed at regular intervals in this rotating body. Each of these rolling chambers 2 is a through-hole that is formed to penetrate the rotating body 1 in a thickness direction thereof, and has an arcuately curved shape as shown in FIG. 10. In an example shown here, each rolling chamber 2 is formed in laterally symmetrical shapes with respect to a straight line that passes the center of the rotating body 1, and the center of the rolling chamber 2 in a circumference direction of the rotating body 1. A rolling surface 3 is a portion of the inner surface of each rolling chamber 2, the portion being positioned on an outer side of the inner surface of the rolling chamber 2 in the radial direction of the rotating body 1. Furthermore, a rolling body 4 is housed in each of the rolling chambers 2 such that the rolling body 4 can move reciprocally along the rolling surface 3.

Figure 1:
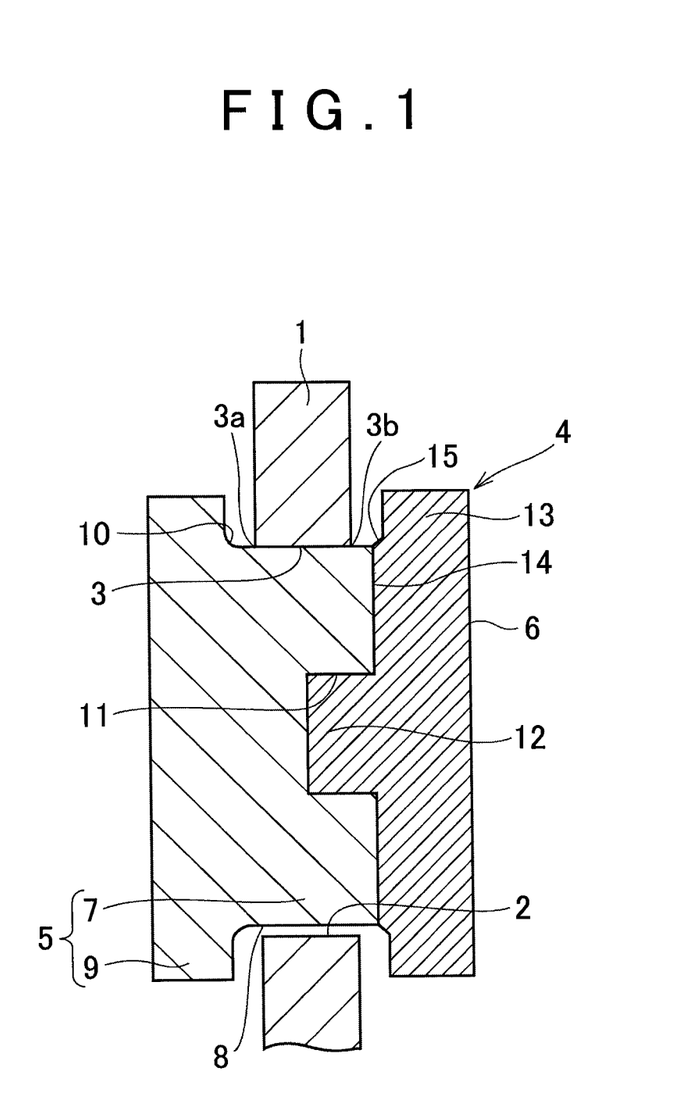
FIG. 1 is a sectional view of an example of a torsional vibration reducing apparatus according to the invention.

FIG. 1 is a sectional view of the example of the torsional vibration reducing apparatus according to the invention. The rolling body 4 is configured by including two members: a first member 5 and a second member 6 that is formed separately from the first member 5. The first member 5 includes a columnar support shaft portion 7. This support shaft portion 7 is longer than a plate thickness of the rotating body 1. Moreover, the support shaft portion 7 is formed such that an outer diameter thereof is smaller than an opening width of the rolling chambers 2 in the radial direction of the rotating body 1. An outer circumferential surface 8 of this support shaft portion 7 is a portion that is brought into contact with the rolling surface 3, and is pressed against the rolling surface 3 by a centrifugal force as will be described below. A flange portion 9 is projected from the outer circumferential surface 8 outward in the radial direction of the support shaft portion 7. The flange portion 9 here corresponds to a first flange portion. The flange portion 9 is formed such that an outer diameter thereof is larger than the opening width of the rolling chamber 2. In a central part of the other end of the support shaft portion 7, a concave section 11 that is recessed in an axial direction is formed. A convex section 12 that is fitted to or pressed into the concave section 11 is formed in a central portion in the radial direction of the second member 6.

A concave surface 10 is formed in a corner portion located between the outer circumferential surface 8 of the support shaft portion 7 and the flange portion 9. As it will be described below, an edge portion 3a of the rolling surface 3 is configured to abut against this concave surface 10.

In the example shown in FIG. 1, the second member 6 is a disc-shaped member with three steps, and a top step portion is the convex section 12. An outer circumferential section in a bottom step portion is a flange portion 13 that is paired with the flange portion 9 when the second member 6 is attached to the first member 5. This flange portion 13 corresponds to a second flange portion. Accordingly, the bottom step portion is formed such that an outer diameter thereof is equal to the outer diameter of the flange portion 9, and is also formed to have the same plate thickness as the flange portion 9. A portion between the flange portion 13 and the convex section 12 is an intermediate section 14, and an outer circumferential surface of the intermediate section 14 has a tapered surface 15. The outer diameter of the tapered surface 15, which is measured at a position where the tapered surface 15 is in contact with the support shaft portion 7, is equal to the outer diameter of the support shaft portion 7. Meanwhile, the tapered surface 15 is formed such that an outer diameter at an end on the flange portion 13 side thereof is larger than the outer diameter of the support shaft portion 7 and is smaller than an outer diameter of the flange portion 13. In addition, the tapered surface 15 is a corner portion positioned between the outer circumferential surface 8 of the support shaft portion 7 and the flange portion 13. As it will be described below, an edge portion 3b of the rolling surface 3 is configured to abut against this tapered surface 15. It should be noted that the second member 6 corresponds to an attachment flange in the invention and that each of the concave surface 10 and the tapered surface 15 corresponds to a corner portion between an outer circumferential surface of a support shaft portion and the flange portion in the invention.

In the torsional vibration reducing apparatus according to the above-described aspect, the second member 6 is attached to the support shaft portion 7 of the first member 5 that is housed in the rolling chamber 2. In this way, when the rotating body 1, in which the rolling body 4 is held in the rolling chamber 2, rotates with the rotating member, which is not shown, the rolling body 4 is pressed against the rolling surface 3 by the centrifugal force. In this case, the outer circumferential surface 8 of the support shaft portion 7 is brought into contact with the rolling surface 3, and this is the state shown in FIG. 1. When torsional vibration is generated in the rotating member and the rotating body 1 attached thereto in this state, the rolling body 4 makes reciprocal motion along the rolling surface 3 in accordance with the torsional vibration. The torsional vibration is reduced by this reciprocal motion.

Figure 2:
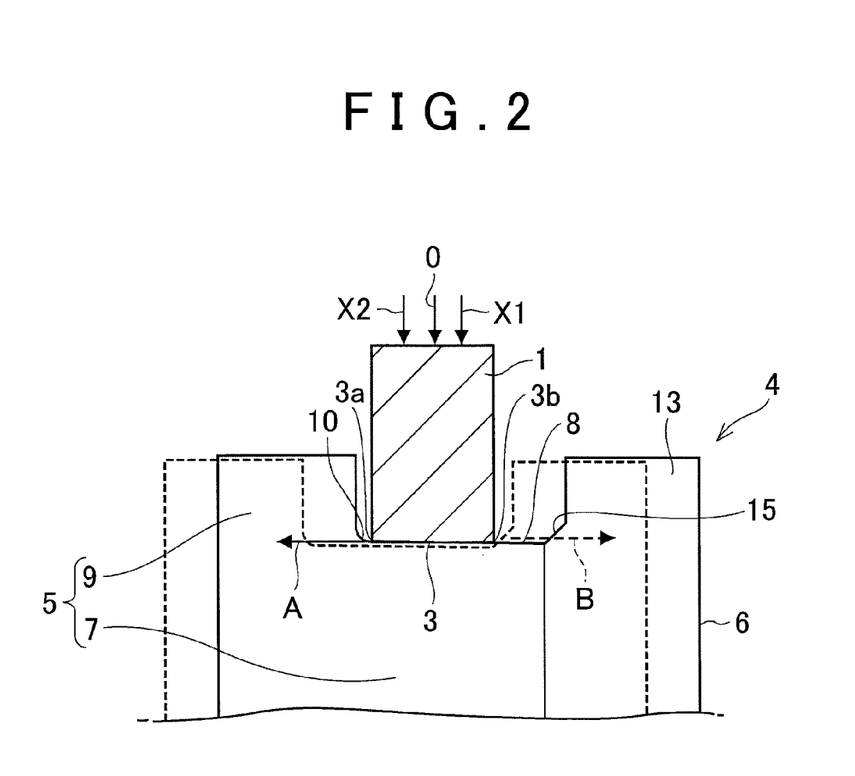
FIG. 2 is a sectional view of a state that a rotating body and a rolling body in the invention abut against each other.
Figure 3:
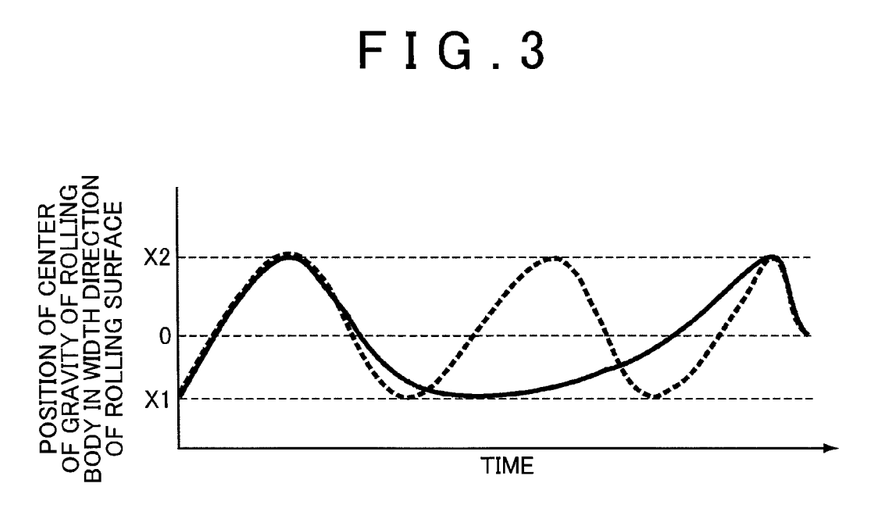
FIG. 3 is a graph of trajectories of a position of the center of gravity of the rolling body in a width direction of a rolling surface.

FIG. 2 is a sectional view of an example of a state that a force in an axial direction of the rotating body 1 acts on the rolling body 4 that makes the reciprocal motion along the rolling surface 3 and that the rolling body 4 thereby abuts against the rotating body 1. As indicated by a solid line in FIG. 2, the rolling body 4 is moved to a right side in FIG. 2 by the above-described force in the axial direction of the rotating body 1. Then, the concave surface 10 of the rolling body 4 abuts against the edge portion 3a of the rolling surface 3. The direction of the centrifugal force acting on the rolling body 4 is divided into two directions at the tangent line when the edge portion 3a abuts to the concaved surface 10. One direction is of the centrifugal force, and the other is a direction parallel to a central axis of the rotating body 1. The centrifugal force that is parallel to the central axis of the rotating body 1 is an axial force A, and the axial force is acting on the rolling body 4. The magnitude of the axial force A is defined in accordance with the magnitude of the original centrifugal force and the angle, that is defined by the outer circumferential surface 8 and a tangent line to the concave surface 10 at the edge section 3a. The rolling body 4 is returned from the right side to a left side in FIG. 2 by the axial force A. Furthermore, in a state that the concave surface 10 abuts against the edge portion 3a, the center of gravity of the rolling body 4 is positioned on the right side of a center O in a width direction of the rolling surface 3 in FIG. 2. A position of the center of gravity of the rolling body 4 in the width direction of the rolling surface 3 is indicated by an arrow X1 in FIG. 2.

When the rolling body 4 is returned from the right side to the left side in FIG. 2 by the axial force A, as indicated by a broken line in FIG. 2, the tapered surface 15 of the rolling body 4 abuts against the edge portion 3b of the rolling surface 3. In this case, the direction of the centrifugal force acting on the rolling body 4 is divided into two directions. One direction is of the centrifugal force, and the other is a direction parallel to the central axis of the rotating body 1. The centrifugal force that is parallel to the central axis of the rotating body 1 is an axial force B, and the axial force B is acting on the rolling body 4. The magnitude of the axial force B is defined in accordance with the magnitude of the original centrifugal force and the angle, that is defined by the outer circumferential surface 8 and a tapered surface 15. The rolling body 4 is returned from the left side to the right side in FIG. 2 by the axial force B. In addition, in a state that the tapered surface 15 abuts against the edge portion 3b, the center of gravity of the rolling body 4 is positioned on the left side of the center O in the width direction of the rolling surface 3 in FIG. 2. The center of gravity of the rolling body 4 is indicated by an arrow X2 in FIG. 2.

In the torsional vibration reducing apparatus, each of the axial forces A, B acts on the rolling body 4 as a so-called aligning force for returning the rolling body 4 to a regular position on the rolling surface 3, that is, to the center O side in the width direction of the rolling surface 3. In addition, as described above, shapes of the corner portions of the rolling body 4 that respectively abut against the edge portions 3a, 3b of the rolling surface 3 differ from each other. Accordingly, magnitudes of the axial forces A, B that are generated at each of the corner portions in the rolling body 4 differ from each other. In the example shown here, the concave surface 10 and the tapered surface 15 are configured such that the axial force A generated in the concave surface 10 of the rolling body 4 is smaller than the other axial force B generated in the tapered surface 15 of the rolling body 4. Thus, the rolling body 4 is slowly moved from the right side to the left side in FIG. 2 in the width direction of the rolling surface 3 by the small axial force A. In addition, the rolling body 4 is promptly moved from the left side to the right side in FIG. 2 in the width direction of the rolling surface 3 by the large axial force B. This is indicated by a solid line in FIG. 3. As a result, the reciprocal motion of the rolling body 4 in the axial direction of the rotating body 1 is less likely to be repeated in a constant cycle, and thus the rolling body 4 is less likely to be resonated.

For this reason, it is possible to suppress the strong vibration of the rolling body 4 in the axial direction. It is thus possible to suppress the inhibition of the reciprocal motion of the rolling body 4 in the circumferential direction of the rotating body 1. Therefore, the quality of the vibration control increases. It is also possible to suppress the violent collision of the rolling body 4 against the edge portions 3a, 3b of the rolling surface 3, and is possible to suppress the noise or vibration generated from the collision. Furthermore, as described above, the magnitudes of the axial forces A, B differ from each other in this torsional vibration reducing apparatus. Accordingly, in a case where the rolling body 4 is displaced in the width direction of the rolling surface 3 by the small axial force A, the rolling body 4 is less likely to slip in the width direction of the rolling surface 3 compared to a case where the rolling body 4 is displaced in the width direction of the rolling surface 3 by the large axial force B. Thus, unnecessary friction is less likely to be generated between the rolling body 4 and the rolling surface 3. Therefore, durability of the torsional vibration reducing apparatus can be improved.

It should be noted that, in the case where the portions of the rolling body 4 that respectively abut against the edge portions 3a, 3b of the rolling surface 3 have the same shape, the magnitudes of the axial forces A, B that are generated in each of the corner portions 10, 15 in the axial direction of the rolling body 4 possibly become the same or substantially the same. In such a case, as indicated by a broken line in FIG. 3, the rolling body 4 possibly makes the reciprocal motion in the axial direction of the rotating body 1 in the constant cycle, and thus the rolling body 4 is possibly resonated.

Figure 4:
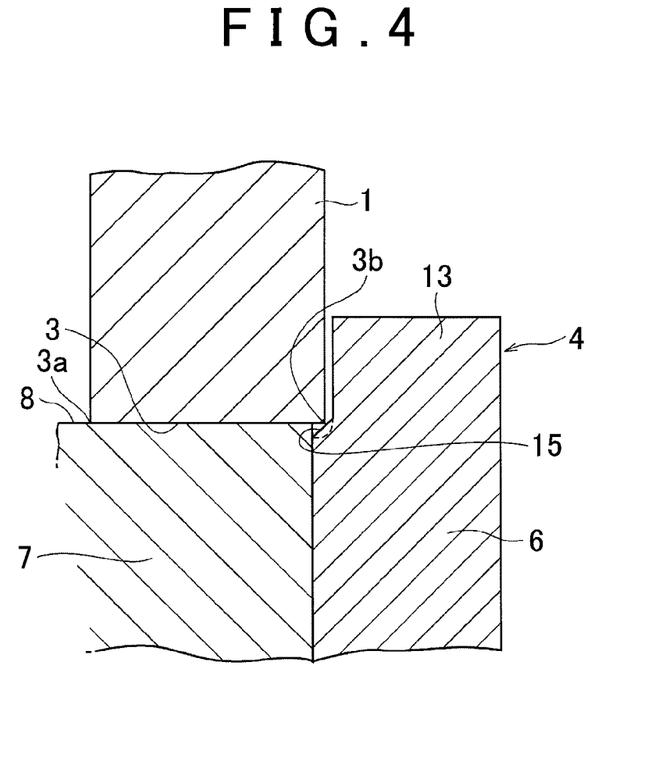
FIG. 4 is a sectional view of an example of a case where a step is formed in a boundary portion between a first member and a second member due to a manufacturing error.

FIG. 4 is a sectional view of an example of a case where a step is formed in a boundary portion between the first member 5 and the second member 6 due to a manufacturing error. In an example shown here, the intermediate section 14 is formed such that an outer diameter of the intermediate section 14 on the support shaft portion 7 side is smaller than the outer diameter of the support shaft portion 7. When the force in the axial direction of the rotating body 1 acts on the rolling body 4 that reciprocates along the rolling surface 3, the rolling body 4 is moved to the left side in FIG. 4, and thus the rotating body 1 and the flange portion 13 approach each other. Here, as indicated by a broken line in FIG. 4, the tapered surface 15 that is formed in the corner portion between the support shaft portion 7 and the flange portion 13 is projected to the outer side in the radial direction of the rolling body 4 compared to a case where the concave surface is formed in the corner portion. Accordingly, when the rolling body 4 is further moved to the left side in FIG. 4, the edge portion 3b of the rolling surface abuts against the tapered surface 15.

In the torsional vibration reducing apparatus according to the above-described aspect, even in the case where the step is produced in the boundary portion between the first member 5 and the second member 6 due to the manufacturing error, the tapered surface 15 can abut against the edge portion 3b of the rolling surface 3 and thus the surface contact between the flange portion 13 and the rotating body 1 can be avoided. In this way, it is possible to generate the above-described axial force B in the tapered surface 15 and return the rolling body 4 to the center O side in the width direction of the rolling surface 3.

Figure 5:
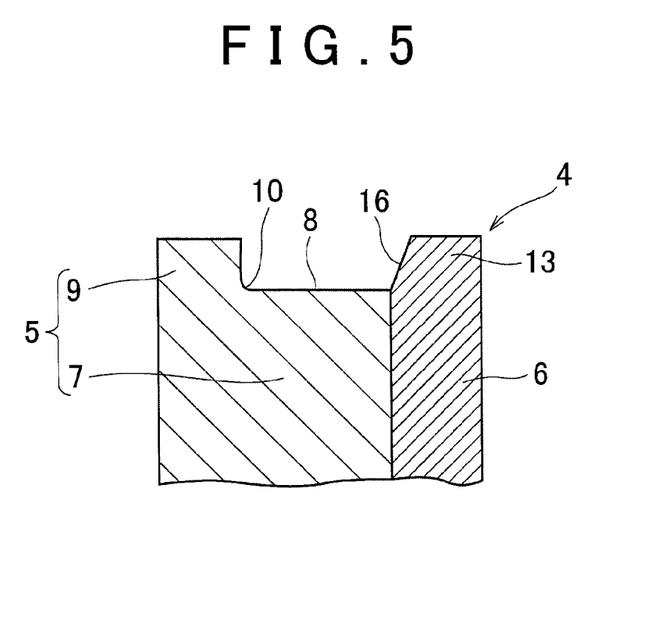
FIG. 5 is a sectional view of another example of the rolling body in the invention.

FIG. 5 is a sectional view of another example of the rolling body 4 in the invention. In an example shown here, a tapered surface 16 is formed in a surface on the support shaft portion 7 side of the flange portion 13 of the second member 6. An end of the tapered surface 16 is formed such that an outer diameter on the support shaft portion 7 side is equal to that of the support shaft portion 7. The rolling body 4 which reciprocates along the rolling surface 3 moves to the left side in FIG. 5 when the axial force of the rotating body 1 acts on, and thus, the tapered surface 16 abuts against the edge portion 3b of the rolling surface 3. Then, the axial force generates in the rolling body 4 in accordance with the centrifugal force that acts on the rolling body 4, and a tapered angle of the tapered surface 16. Then, the rolling body 4 is returned to the center O side in the width direction of the rolling surface 3 by the axial force.

Further, a case where a step shown in FIG. 4 is formed in the boundary portion between the first member 5 and the second member 6 due to the manufacturing error will be described with reference to FIG. 5. In the configuration shown in FIG. 5, the tapered surface 16 is formed in the surface on the support shaft portion 7 side of the flange portion 13. Accordingly, when the force in the axial direction of the rotating body 1 acts on the rolling body 4 and moves the rolling body 4 to the left side in FIG. 5, the tapered surface 16 abuts against the edge portion 3b of the rolling surface 3 without surface contact between the rotating body 1 and the tapered surface 16. As a result, the axial force as the aligning force is generated in the rolling body 4, and the same operational effect as that in the example shown in FIG. 1 can be obtained.

Figure 6:
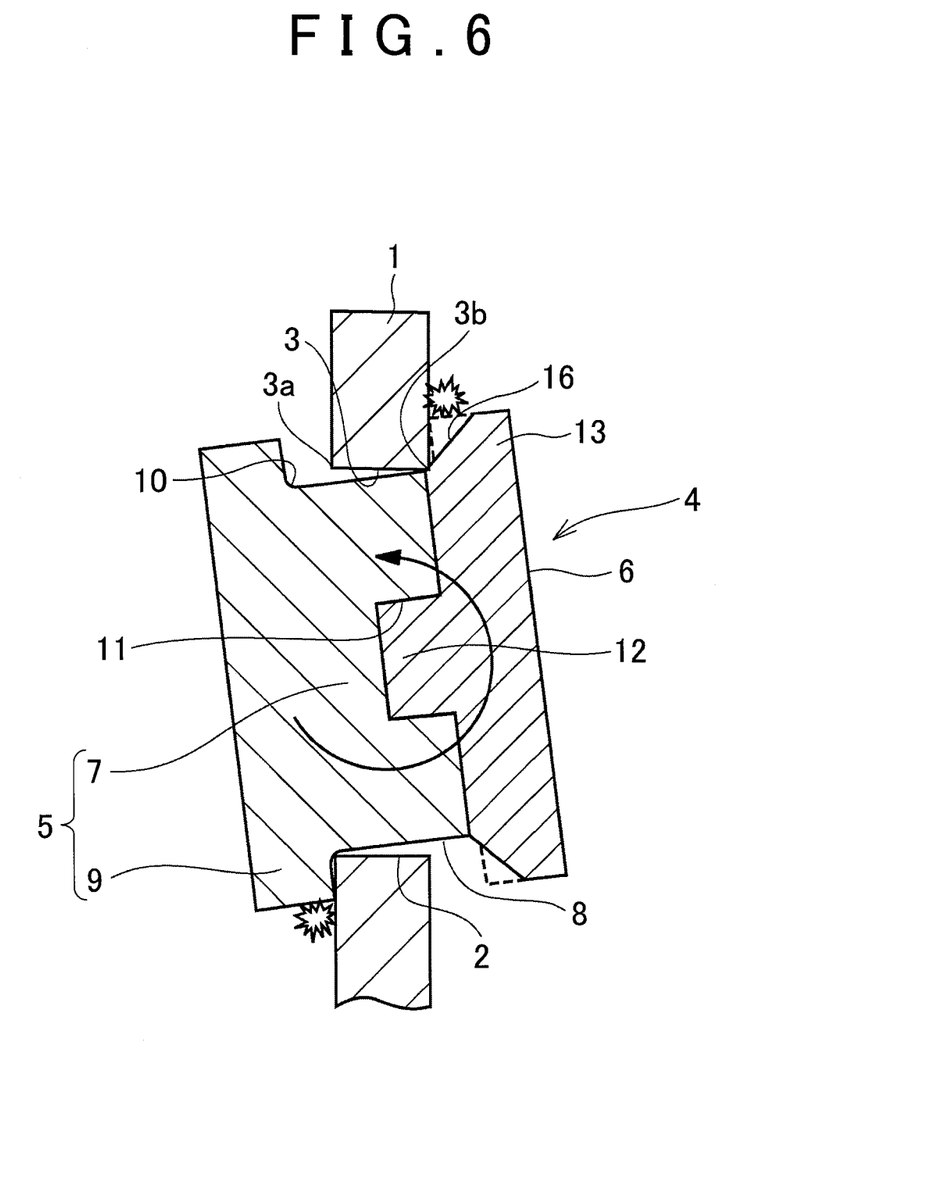
FIG. 6 is a sectional view of a state that the rolling body shown in FIG. 5 is tilted with respect to the rotating body.

Furthermore, a description will be made on a case where the rolling body 4 shown in FIG. 5 is tilted with respect to the rotating body 1. FIG. 6 is a sectional view of an example thereof, and such tilt of the rolling body 4 is possibly generated in the following case. For example, when the centrifugal force on the rolling body 4 is increased or reduced, or when the force in the axial direction of the rotating body 1 is applied to the rolling body 4, a load which tilts the central axis of the rolling body 4 with respect to the central axis of the rotating body 1 is generated in the rolling body 4. In an example shown in FIG. 6, an edge portion of the flange portion 9, on the support shaft portion 7 side, abuts against a side surface of the rotating body 1, that is positioned between the central axis of the rotating body 1 and the inner edge of each rolling chamber 2 in the radial direction of the rotating body 1. Meanwhile, the tapered surface 16 approaches a side surface of the rotating body 1 that is positioned on an outer side of the rolling chamber 2 in the radial direction of the rotating body 1. However, the edge portion on the support shaft portion 7 side of the flange portion 13 does not abut against the side surface. Even when the rolling body 4 that is configured as shown in FIG. 5 is tilted as shown in FIG. 6, just as described, it is possible to avoid or suppress abutment of the flange portion 13 thereof with the side surface of the rotating body 1. Accordingly, when the rolling body 4 is tilted as described above, the reciprocal motion thereof is less likely to be inhibited. In this way, it is possible to suppress degradation of a vibration damping property when the rolling body 4 is tilted.

Figure 7A:
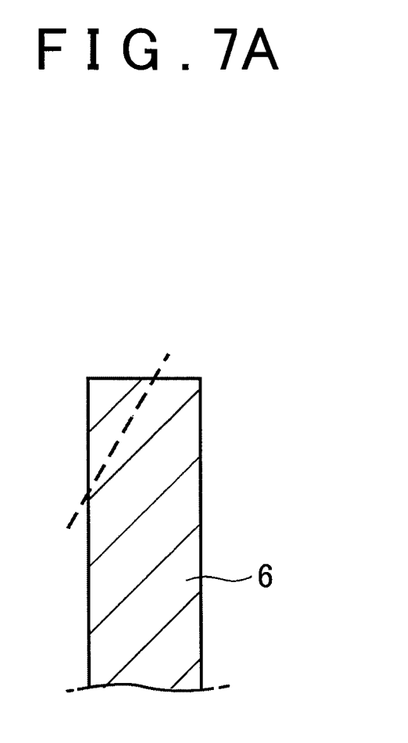
FIG. 7A is a sectional view for explaining a method for processing a tapered surface with respect to the second member, and shows the second member before being processed.
Figure 7B:
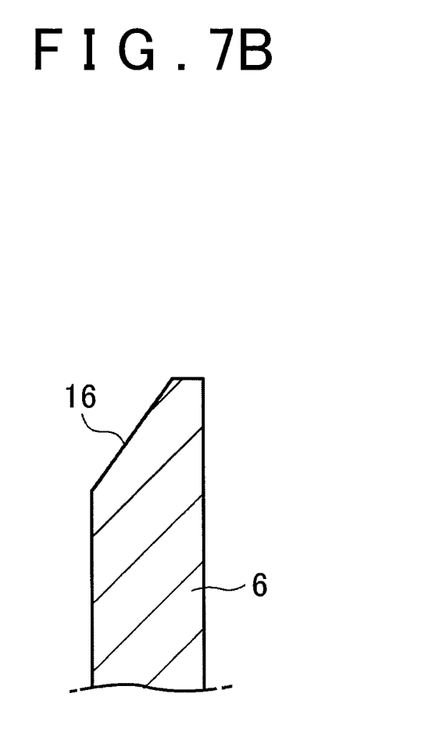
FIG. 7B is a sectional view for explaining the method for processing a tapered surface with respect to the second member, and shows the second member after being processed.

Here, a brief description will be made on a method for processing the tapered surface 16 with respect to the second member 6. FIG. 7 includes sectional views for explaining the method. FIG. 7A shows the second member 6 before being processed, and FIG. 7B shows the second member 6 after being processed. As shown in FIG. 7A, the tapered surface 16 can be formed by shaving or cutting a specified position in an outer circumferential section of the second member 6. In particular, when the tapered surface 16 is formed by cutting the specified position of the second member 6, the tapered surface 16 can be formed in the second member 6 in one step. It should be noted that the above-described method for processing, in which the second member 6 is shaved or cut, may be a conventionally known method.

Figure 8A:
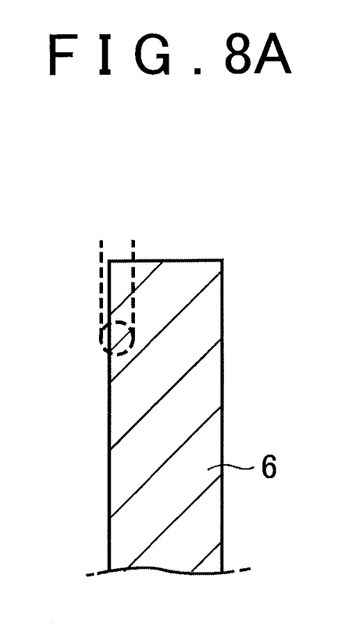
FIG. 8A is a sectional view for explaining a method for processing a concave surface with respect to the second member, and shows the second member before being processed.
Figure 8B:
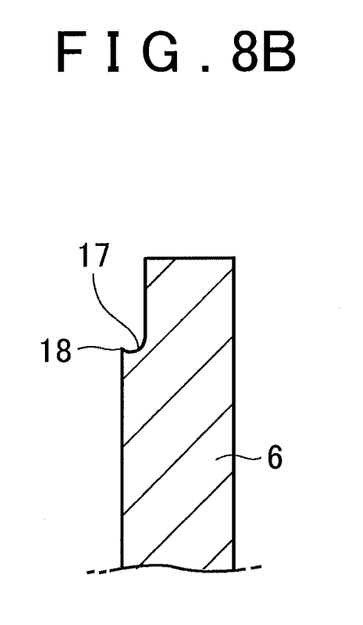
FIG. 8B is a sectional view for explaining the method for processing a concave surface with respect to the second member, and shows the second member while being processed.
Figure 8C:
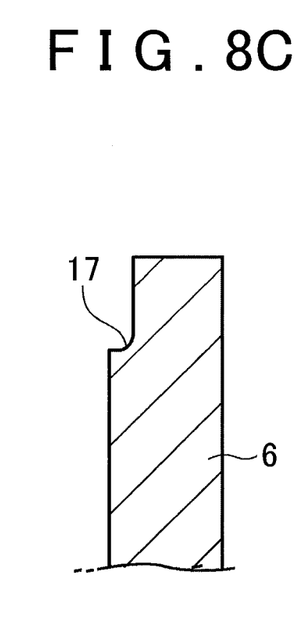
FIG. 8C is a sectional view for explaining the method for processing a concave surface with respect to the second member, and shows the second member after being processed.

In addition, a description will be made on a method for processing a concave surface with respect to the second member 6 as a comparative example. FIG. 8 includes sectional views for explaining the method. FIG. 8A shows the second member 6 before being processed, FIG. 8B shows the second member 6 while being processed, and FIG. 8C shows the second member 6 after being processed. As shown in FIG. 8A, a specified position in one surface of the second member 6 is shaved by a shaving tool such as an end mill or a cutter. As a result, the second member 6 is formed with a concave surface 17 that corresponds to the size of the shaving tool. In addition, as shown in FIG. 8B, when the above shaving processing is performed, unshaved portion 18 may be produced at an end on the one surface side of the second member 6. Thus, as shown in FIG. 8C, the unshaved portion 18 is removed, and a processed surface thereof is flattened in a next step. When the concave surface is formed, just as described, there is a case where the step for removing the unshaved portion 18 is added compared to a case where the above-described tapered surface 16 is formed. In a configuration shown in FIG. 5, the tapered surface 16 can be formed in the second member 6 in one step. Thus, compared to the case where the concave surface is formed, it is possible to suppress an increase in the number of processing steps. In addition, since the tapered surface 16 can be formed in the single processing, the tapered surface 16 can easily be manufactured.

Figure 9:
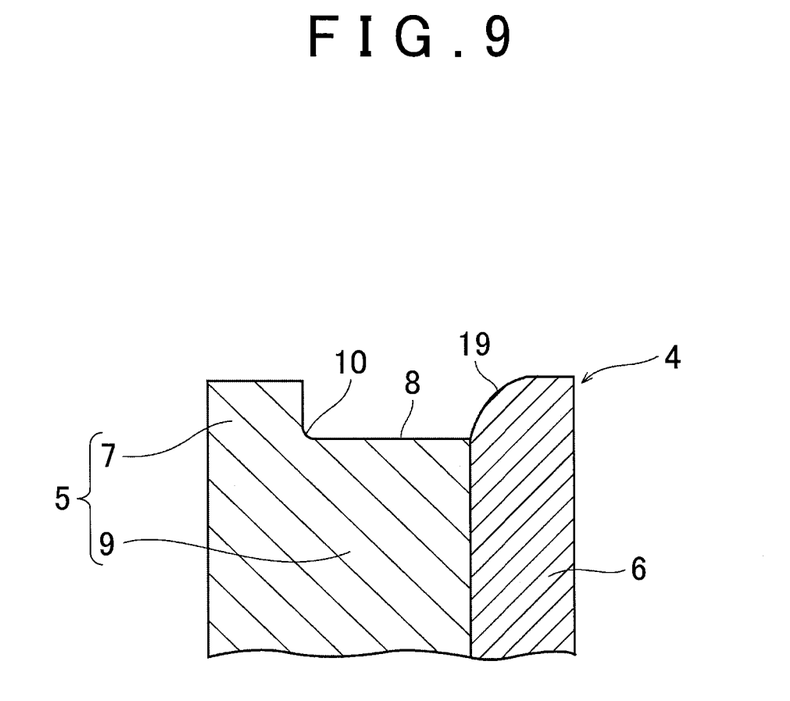
FIG. 9 is a sectional view of yet another example of the rolling body in the invention.
Figure 10:
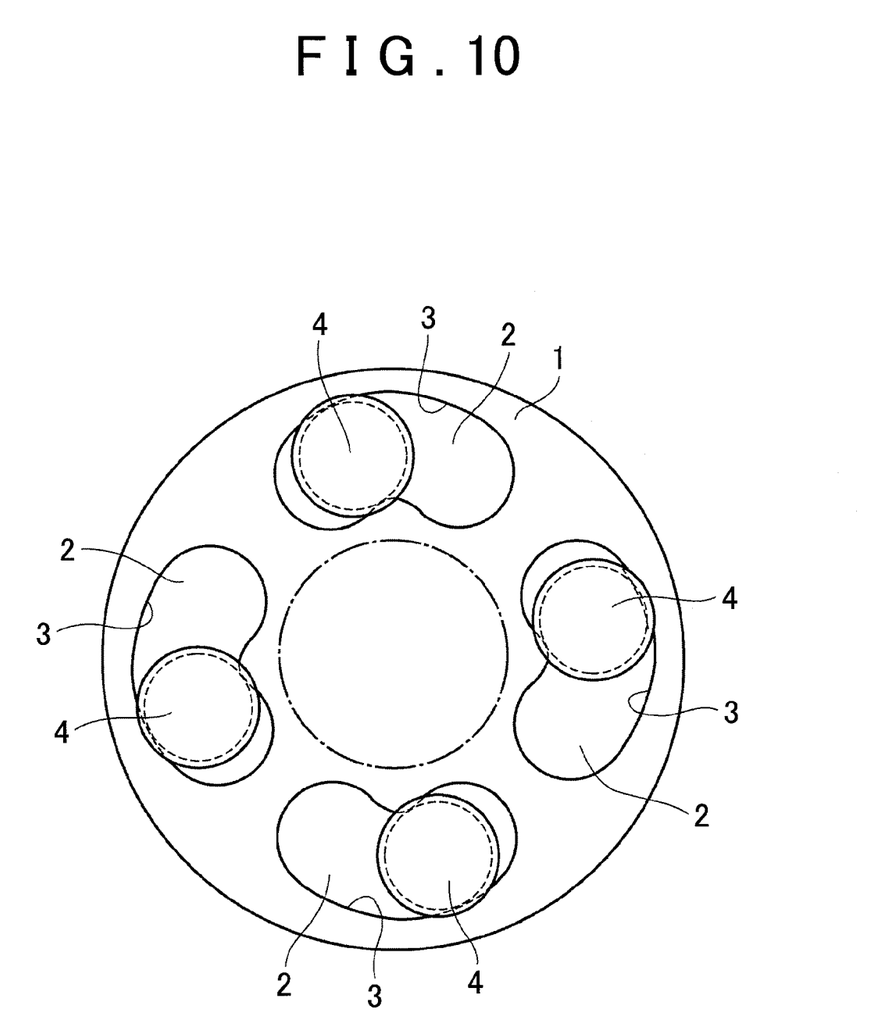
FIG. 10 is a front view of an example of a torsional vibration reducing apparatus according to the invention.

FIG. 9 is a sectional view of yet another example of the rolling body 4 in the invention. In an example shown here, instead of the tapered surface 16 shown in FIG. 5, a convex surface 19 is formed in the second member 6. When the force in the axial direction of the rotating body 1 acts on the rolling body 4 that reciprocates along the rolling surface 3 and moves the rolling body 4 to the left side in FIG. 9, the convex surface 19 abuts against the edge portion 3b of the rolling surface 3. In this case, an angle is defined by the outer circumferential surface 8 of the support shaft portion 7 and a plane including a tangent line at the convex surface 19 and the edge portion 3b, that is, a tangent angle of the tangent line is defined. Further, an axial force in the direction that is parallel to the central axis of the rotating body 1 in accordance with the centrifugal force acting on the rolling body 4 is generated in the rolling body 4. The rolling body 4 is returned to the center O side of the rolling surface 3 by the axial force. Furthermore, a description will be made on a case where the convex surface 19 is formed such that an outer diameter at an end on the support shaft portion 7 side thereof is smaller than the outer diameter of the support shaft portion 7 due to a manufacturing error and where a step is thus formed in the boundary portion between the first member 5 and the second member 6. As described above, the surface on the support shaft portion 7 side of the flange portion 13 is formed as the convex surface 19. For this reason, when the force in the axial direction of the rotating body 1 acts on the rolling body 4 and moves the rolling body 4 to the left in FIG. 9, the convex surface 19 abuts against the edge portion 3b of the rolling surface 3 without making surface contact between the convex surface 19 and the rotating body 1. As a result, the axial force as the aligning force is generated in the rolling body 4. Thus, also with a configuration shown in FIG. 9, the same operational effect as that in the example shown in FIG. 1 can be obtained.

The detailed description has been made so far on the preferred embodiment of the invention on the basis of the drawings. However, the invention is not limited thereto, but can be implemented by adding various modifications without departing from the spirit of the invention.

The invention claimed is:

1. A torsional vibration reducing apparatus comprising:
a rotating body having a rolling chamber,
the rolling chamber being a through-hole that extends through the rotating body in a thickness direction of the rotating body; and
a rolling body including a support shaft portion, a first flange portion, a second flange portion, a first corner portion, and a second corner portion,
the support shaft portion being housed in the rolling chamber of the rotating body,
a length of the support shaft portion in an axial direction being longer than a thickness of the rotating body;
the first flange portion and the second flange portion each having a larger outer diameter than an outer diameter of the support shaft portion,
the first flange portion being located at one end of the support shaft portion in the axial direction,
the second flange portion being located at an other end of the support shaft portion in the axial direction,
the first corner portion being defined by the support shaft portion and a rotating body side surface of the first flange portion,
the second corner portion being defined by the support shaft portion and a rotating body side surface of the second flange portion, and
a section shape of the first corner portion is more concave than a section shape of the second corner portion in a section of the rolling body along a central axis of the support shaft portion.

2. The torsional vibration reducing apparatus according to claim 1, wherein
the first corner portion is a concave surface, and the second corner portion is a tapered surface of which an outer diameter is increased from the support shaft portion to an outer side in a radial direction of the rolling body.

3. The torsional vibration reducing apparatus according to claim 1, wherein
the first corner portion includes a concave surface, and the second corner portion includes a convex surface.

4. The torsional vibration reducing apparatus according to claim 1, wherein
the rolling body includes a first member and a second member,
the first member includes the first flange portion and the support shaft portion, the first flange portion is provided at the one end of the support shaft portion, and the second member is a separate attachment flange that is in a disc-shape and the second member includes the second flange portion attached to the other end of the support shaft portion.

5. The torsional vibration reducing apparatus according to claim 4, wherein
the first member includes a concave section that receives a convex section of the second member.

* * * * *